Patented Oct. 30, 1945

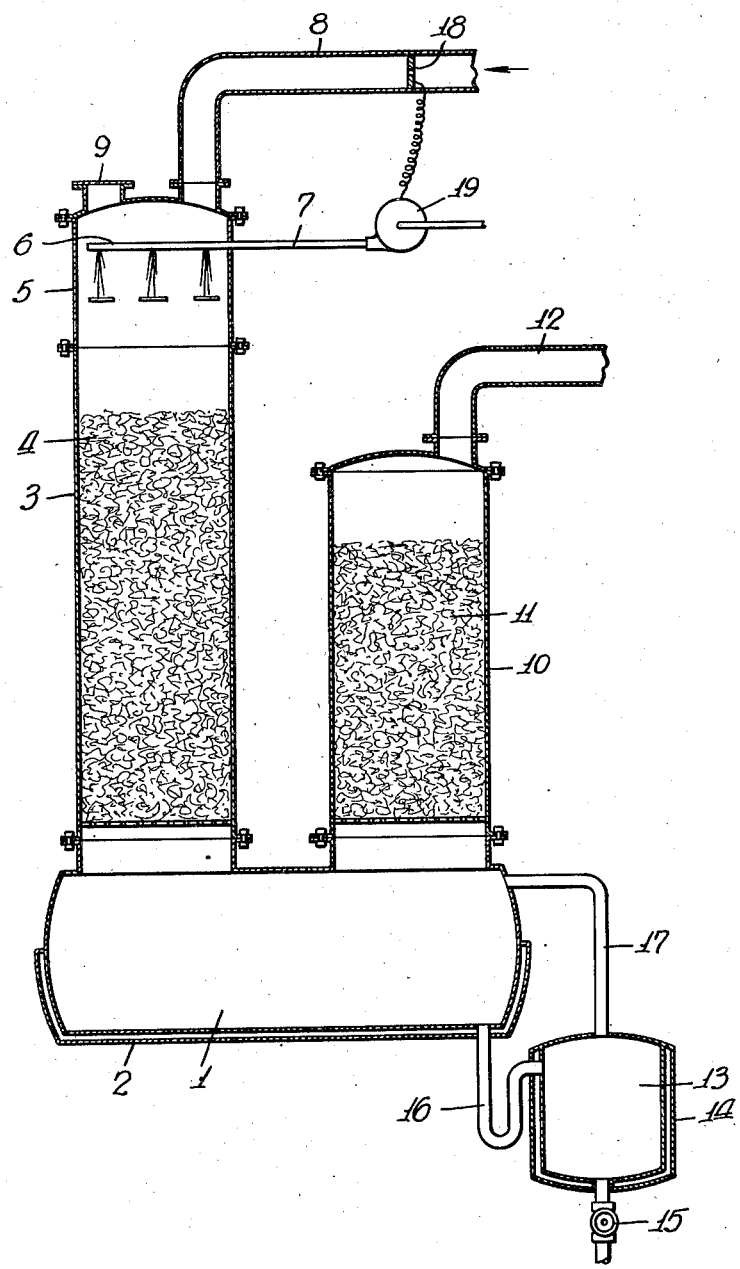

2,388,198

UNITED STATES PATENT OFFICE 2,388,198

PROCESS FOR THE VAPORIZATION OF ORGANIC COMPOUNDS

John M. Weiss, New York, N. Y., assignor to John M. Weiss and Co., New York County, N. Y.

Application July 15, 1943, Serial No. 494,874

4 Claims. (Cl. 260—342)

In the manufacture of phthalic anhydride by vapor phase oxidation by air in the presence of a catalyst, it is necessary to produce a suitable mixture of air and naphthalene or other hydrocarbon used. The usual raw material is a crude naphthalene containing varying amounts of methyl naphthalene and other liquid hydrocarbons, some non-volatile, or at least relatively high boiling material, usually styled "tar," as well as lesser amounts of other impurities which, under the proper conditions, can polymerize to produce more "tar."

Several types of naphthalene vaporizers are in practical use. One involves maintaining a body of molten crude naphthalene in a vessel at a predetermined temperature and passing a comminuted stream of air through the body of liquid. Heat is supplied either by outside heating, heating the incoming stream of air or both. This gives a mixture of air and naphthalene which is richer in hydrocarbon content than is customarily used in phthalic anhydride manufacture and hence this stream of "primary" air after saturation is mixed with a stream of "secondary" air to give a mixture dilute enough to be out of the explosive range, which mixture is passed to the catalytic convertor. Besides the disadvantage of the dual control of air streams and the extra valves and instruments required for two air streams, the hot naphthalene is kept in prolonged contact with air in the vaporizer which causes increased formation of "tar" from polymerizable materials and as the "tar" content increases, there is an increasing tendency toward its entrainment in the vapor stream along with unvaporized liquid naphthalene. Such entrainment causes carbon deposition in the catalyst and is destructive of catalytic activity, making frequent catalytic renewals necessary.

Other devices in use pass a stream of air over the surface of a flowing or quiescent body of molten crude naphthalene controlling the contact surface in relation to the temperature so as to obtain the degree of vaporization desired. This method also results in prolonged contact between air and naphthalene and induces "tar formation" although not to the same degree as with those devices where the stream of air is passed through the naphthalene. Due to the fact that these methods are based on inefficient vaporization, any change in rate of air flow gives a different composition of mixed vapor unless the temperature is adjusted to suit. This is especially disadvantageous in the initial operation of the plant when low and changing rates of flow are desired. Under such circumstances, there is danger of too much vaporization and hence formation of explosive mixtures.

According to the present invention, the previous disadvantages have been overcome by passing a stream of liquid naphthalene and a stream of air concurrently downward over an extended surface and controlling the naphthalene stream in accordance with the rate of flow of the stream of air. Such concurrent flow has the additional advantage of allowing the construction of a vaporizer with much lower pressure drop than one in which the flow of the naphthalene and air are countercurrent and moreover presents very much less chance of entrainment of liquid than would exist with countercurrent flow.

The invention is illustrated by the accompanying drawing which however is not intended to limit the scope of the invention, such scope being defined only by the appended claims.

In the drawing, numeral 1 represents a vessel which may be provided with a steam jacket 2 for heating. Connected to the top of the vessel is a column section 3 filled with packing 4, for example Raschig rings, to provide an extended surface for contact. Above the column section 3 is a chamber 5 which may be integral with the column section or arranged as shown as a separate section. This chamber 5 contains spray heads or other devices 6 to distribute liquid naphthalene introduced through the pipe 7. Air may be fed to the apparatus by the pipe 8, the opening 9 serving to accommodate an explosion flange or act as a handhole. The column 3 and chamber 5 may be provided with steam heating jackets. Instead of the packing 4, extended radiator sections provided with steam may be employed as both surface and heating means.

Another short column section 10 with packing 11 and exit pipe 12 serves as a spray remover for the mixture of naphthalene and air. These may be steam jacketed if desired. Other forms of spray remover may be used instead of the section 10 with packing 11.

The vessel 13 with jacket 14 and draw-off cock 15 serves to collect residue or "tar" from the vessel 1, flowing to it through the trapped pipe 16. The pipe 17 is provided to equalize the pressures between the vessels 1 and 13. Alternately, the vessel 13 may be omitted and "tar" drawn directly from the vessel 1.

In the incoming air line 8 an air measuring and controlling device 18 is provided and this is arranged so as to control the action of the pump 19 to introduce naphthalene in an exact ratio to the flow of air. Such proportioning pumps controlled in a relation to another stream of fluid are common articles of commerce and no detailed description of them and their method of operation are required.

In operation, air at a known and constant pressure and temperature is introduced to the pipe 8 passing the measuring controller 18 which actuates the pump 19 to introduce a stream of naphthalene into the pipe 7 equivalent, for example, to one part by weight for every thirty parts by weight of air, which is outside the explosive mixture range. The air and naphthalene pass concurrently downward over the extended surface 4 which gives contact and vaporizes the naphthalene fed in with the air. This downward concurrent flow is important since the back pressure is much lower than with countercurrent flow and there is no danger of flooding and the excessive entrainment of liquid which this would cause. The heat of vaporization may be provided by the temperature of the incoming air or in part by the air and in part or all by steam jackets on the vessel 3 or by extended surface radiator sections heated by steam replacing the packing 4 shown.

Any residual "tar" drips from the packing 4 into the vessel 1 and is removed therefrom by the pipe 16 either through the tank 13 or directly as previously stated.

The vessel 1 also serves to decrease the linear velocity of the stream and allow the separation of liquid droplets. The removal of liquid droplets is completed by the column 10 with packing 11 or by such other forms of spray remover as may be employed. The mixture of air and naphthalene leaves by the pipe 12 and goes to a catalytic converter or other device for its utilization.

The term naphthalene as used in the claims is intended to include crude or refined material. The process or apparatus may be used to vaporize other organic compounds to provide a mixture with air suitable for use in producing partial oxidation products by vapor phase catalytic oxidation.

Having thus described my invention, I claim:

1. The method of forming a naphthalene vapor and air mixture for vapor phase catalytic oxidation, which comprises delivering air and liquid naphthalene in predetermined relative proportions to the upper part of a tower containing members presenting a multitude of separate surfaces over which and from one to another of which liquid naphthalene may flow, sweeping the liquid naphthalene downwardly and distributing it as thin films over said surfaces by the action of the downflowing current of air while maintaining the temperature of the air and naphthalene substantially above the melting point of the naphthalene, whereby the liquid naphthalene is exposed to evaporating action in said thin films and on said surfaces.

2. The method of forming a naphthalene vapor and air mixture for vapor phase catalytic oxidation, which comprises delivering air and liquid naphthalene in predetermined relative proportions to the upper part of a tower containing members presenting a multiple of separate surfaces over which and from one to another of which liquid naphthalene may flow, sweeping the liquid naphthalene downwardly and distributing it as thin films over said surfaces by the action of the downflowing current of air while maintaining the temperature of the air and naphthalene substantially above the melting point of the naphthalene, whereby the liquid naphthalene is exposed to evaporating action in said thin films and on said surfaces, and separating and withdrawing non-vaporized material from the gaseous mixture of air and naphthalene at the bottom of the tower.

3. In the conversion of a normally solid hydrocarbon in liquid form to partial oxidation products by vapor phase catalytic oxidation involving the preparation of a vapor phase hydrocarbon mixture from said hydrocarbon and air, the improvement which comprises delivering said hydrocarbon in liquid form and said air in predetermined relative proportions, and at a temperature substantially above the melting point of said normally solid hydrocarbon, down through a column offering comparatively low resistance to fluid flow and presenting a plurality of bafflings in the path of flow and over which said liquid hydrocarbon may flow in thin films, sweeping the liquid hydrocarbon downwardly and over said surfaces, and simultaneously evaporating said hydrocarbon during the downward flow by the action of the downwardly flowing current of the air, whereby substantially all of the liquid hydrocarbon is evaporated and a homogeneous mixture is formed.

4. In the conversion of a normally solid hydrocarbon in liquid form to partial oxidation products by vapor phase catalytic oxidation involving the preparation of a vapor phase hydrocarbon mixture from said hydrocarbon and air, the improvement which comprises delivering said hydrocarbon in liquid form and said air in predetermined relative proportions, and at a temperature substantially above the melting point of said normally solid hydrocarbon, down through a column offering comparatively low resistance to fluid flow and presenting a plurality of bafflings in the path of flow and over which said liquid hydrocarbon may flow in thin films, sweeping the liquid hydrocarbon downwardly and over said surfaces, simultaneously evaporating said hydrocarbon during the downward flow by the action of the downwardly flowing current of air, whereby substantially all of the liquid hydrocarbon is evaporated and a homogeneous mixture is formed, and separating and withdrawing non-vaporous material from said mixture after leaving said surfaces.

JOHN M. WEISS.